US008335069B2

(12) United States Patent
Tegt et al.

(10) Patent No.: US 8,335,069 B2

(45) Date of Patent: Dec. 18, 2012

(54) OVERVOLTAGE PROTECTION ELEMENT

(75) Inventors: Michael Tegt, Lemgo (DE); Rainer Durth, Horn-Bad Meinberg (DE); Christian Depping, Lemgo (DE); Joachim Wosgien, Löhne (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 206 days.

(21) Appl. No.: 12/844,983

(22) Filed: Jul. 28, 2010

(65) Prior Publication Data

US 2011/0026184 A1 Feb. 3, 2011

(30) Foreign Application Priority Data

Jul. 28, 2009 (DE) ........................ 10 2009 035 060

(51) Int. Cl.
*H02H 1/00* (2006.01)

(52) U.S. Cl. ........................................ 361/127; 361/126

(58) Field of Classification Search ........... 361/126–127
See application file for complete search history.

(56) References Cited

U.S. PATENT DOCUMENTS

| | | | | |
|---|---|---|---|---|
| 1,902,861 | A | | 3/1933 | Kebler |
| RE42,319 | E | * | 5/2011 | Martenson et al. ........... 361/124 |

FOREIGN PATENT DOCUMENTS

| | | | |
|---|---|---|---|
| DE | 42 41 311 | C2 | 6/1995 |
| DE | 699 04 274 | T2 | 8/2003 |
| EP | 0 987 803 | B1 | 12/2002 |
| JP | 10-064707 | A | 3/1998 |
| WO | 2008/068115 | A1 | 6/2008 |

* cited by examiner

*Primary Examiner* — Dharti Patel

(74) *Attorney, Agent, or Firm* — Roberts Mlotkowski Safran & Cole, P.C.; David S. Safran

(57) ABSTRACT

An overvoltage protection element with a housing, with at least one overvoltage limiting component which is located in the housing, especially a varistor, with two terminal lugs which are each connected to a respective pole of the overvoltage limiting component in an electrically conductive manner, especially soldered or welded, and with two connecting elements for electrical connection of the overvoltage protection element to the current path or signal path to be protected. In the normal state of the overvoltage protection element, the connecting elements are each in electrically conductive contact with a respective terminal lug. The overvoltage protection element can be produced especially easily and economically by the first terminal lug and the first connecting element being integrally connected to one another and by the free end of the first connecting element which faces away from the overvoltage limiting component being made as a plug-in contact.

9 Claims, 6 Drawing Sheets

OVERVOLTAGE PROTECTION ELEMENT

BACKGROUND OF THE INVENTION

1. Field of the Invention

The invention relates to an overvoltage protection element with a housing, with at least one overvoltage limiting component which is located in the housing, especially a varistor, with two terminal lugs which are each connected to one pole of the overvoltage limiting component in an electrically conductive manner, especially soldered or welded, and with two connecting elements for electrical connection of the overvoltage protection element to the current path or signal path to be protected, in the normal state of the overvoltage protection element the connecting elements each being in electrically conductive contact with one terminal lug at a time.

2. Description of Related Art

The known overvoltage protection elements are generally made as "protective plugs" which together form an overvoltage protection device with the bottom part of the device. For installation of such an overvoltage protection device which, for example, is designed to protect the phase-routing conductors L1, L2, L3 and the neutral conductor N, and optionally, also the ground conductor PE, in the known overvoltage protection devices, there are the corresponding terminals for the individual conductors on the bottom part of the device. For simple mechanical and electrical contact-making of the bottom part of the device with the respective overvoltage protection element, in the overvoltage protection element, the connecting elements are made as plug pins for which there are corresponding sockets which are connected to the terminals in the bottom part of the device, so that the overvoltage protection element can be easily plugged onto the bottom part of the device. This makes it possible to easily replace a defective overvoltage protection element without the conductors connected to the terminals of the bottom part of the device having to be isolated.

In these overvoltage protection devices, installation and mounting can be carried out very easily and in a time-saving manner due to the capacity of the overvoltage protection elements to be plugged in. In addition, these overvoltage protection devices, in part, still have a changeover contact as the signaller for remote indication of the state of at least one overvoltage protection element and an optical state display in the individual overvoltage protection elements. It is indicated by way of the state display whether the overvoltage limiting component which is located in the overvoltage protection element is still serviceable or not. The overvoltage limiting component here is especially varistors, but depending on the application of the overvoltage protection element gas-filled surge arresters, spark gaps or diodes can also be used.

German Patent DE 42 41 311 C2 discloses the initially described overvoltage protection element. In the overvoltage protection element made as a protective plug, the first connecting element is directly connected via a flexible copper band to the first terminal lug on the varistor, while the second connecting element is connected via a second flexible copper band to a rigid disconnection element whose end facing away from the flexible copper band is connected via a solder point to the second terminal lug of the varistor. The disconnection element is exposed to a force from a spring system which leads to the disconnection element being moved linearly away from the terminal lug when the solder connection is broken so that the varistor is electrically isolated when thermally overloaded. Thus, in the known overvoltage protection element there is a thermal disconnector for monitoring the state of a varistor. By way of the spring system, when the solder connection is broken, a telecommunications contact is activated so that remote monitoring of the state of the overvoltage protection element is possible.

European Patent Application EP 0987803 discloses an overvoltage protection element with a thermal isolating mechanism. In this overvoltage protection element, one end of a rigid, spring-loaded slide is soldered both to the first connecting element and also to a terminal lug which is connected to the varistor in the normal state of the overvoltage protection element. Here, undue heating of the varistor also leads to heating of the solder side so that the slide is withdrawn from the connecting site between the first connecting element and the terminal lug as a result of the force of a spring acting on it; this leads to electrical isolation of the varistor.

The plug-in connecting elements which are formed by the sockets located in the bottom part of the device and the contact pins made on the overvoltage protection element must be able to transmit relatively high pulse currents and short circuit currents. Moreover, the plug-in contacts, i.e., the contact pins and the sockets, are mechanically loaded when the overvoltage protection elements are plugged in and withdrawn so that, in the known overvoltage protection elements, correspondingly stable connecting elements are used which are connected to the terminal lugs by way of solder or weld connections.

SUMMARY OF THE INVENTION

A primary object of this invention is to provide an overvoltage protection element of the initially described type which can be produced more easily, and thus, more economically. Here, the overvoltage protection elements should have the same electrical and mechanical properties as the existing overvoltage protection elements.

This object is achieved in an overvoltage protection element of the initially described type in that the first terminal lug and the first connecting element are integrally connected to one another, the free end of the first connecting element which faces away from the overvoltage limiting component being made as a plug-in contact. Thus, in accordance with the invention, the first terminal lug of the overvoltage limiting component is made such that its free end itself is used as the connecting element. Because the first terminal lug and the first connecting element are made in one piece, the additional production step in which the terminal lug is connected to the connecting element by soldering or welding, which step is necessary in the prior art, is eliminated. In addition to simplification of the production process of the overvoltage production element, in the integral execution of the terminal lug and the connecting element in accordance with the invention it is also ensured that the "contact resistance" between the terminal lug and the connecting element is minimized.

In practice, the terminal lugs of the overvoltage limiting component generally have a relatively low material thickness so that the mechanical strength of the free end of the terminal lug acting as the connecting element cannot be enough to permanently withstand the forces which are active in plugging-in and withdrawing the overvoltage element without damage to the connecting element, and thus, deterioration of the plug-in electrical connection between the overvoltage protection element and the bottom part of the device. According to one preferred configuration of the invention, the first connecting element is therefore folded such that it has several layers in the contact region. The contact region is that region of the connecting element in which the connecting element in the plugged-in state of the overvoltage protection element makes contact with the corresponding socket of the bottom part of the device. The connecting element is folded preferably transversely to the lengthwise direction of the connecting element or of the terminal lug. Generally, folding once or twice is sufficient, so that the connecting element has two or three layers in the contact region.

According to another advantageous feature of the invention, the mechanical strength of the folded connecting element is increased by its individual layers being connected to one another positively, nonpositively, or bonded. Here, the connecting region is outside the contact region so that the contact properties of the connecting element do not change due to the implemented connection of the individual layers to one another.

In one especially preferred configuration of the overvoltage protection element in accordance with the invention, a positive connection is made between the first connecting element or the first terminal lug and the housing. During the process of plugging in and withdrawing the overvoltage protection element, a force acts on the overvoltage limiting component which is located in the housing, which force is proportional to the adhesive friction which must be overcome in order to insert the connecting element made as a plug-in contact into the corresponding socket of the bottom part of the device and to pull it out of the socket. By implementing a positive connection between the first connecting element and the housing, the plug-in and withdrawal forces are transmitted directly from the housing to the plug-in contact, or the forces acting on the plug-in contact are accommodated by the housing, so that the forces acting on the overvoltage limiting component are greatly reduced or even completely prevented in the plug-in or withdrawal process.

According to a first version, the free end of the first connecting element has a bend which engages the corresponding receiver in the housing wall. Alternatively to a bend, on the first connecting element one or two laterally projecting catches can also be made which likewise dip into the corresponding receivers in the housing wall or are held in it. According to another configuration, in the first connecting element at least one hole is made into which the corresponding projection fits which is located on the housing wall through which the connecting element projects out of the housing.

The nonpositive connection between the connecting elements of the overvoltage protection element which are made as a plug-in contact and the corresponding sockets of the bottom part of the device is generally implemented by the spring properties of the sockets. For this purpose, the sockets can be made for example, tulip-shaped. According to one alternative configuration, the nonpositive connection between the connecting elements and the sockets of the bottom part of the device takes place by the connecting elements, not the sockets, being made elastic. For this purpose, at least two layers of the connecting element can be bent toward one another such that the connecting element is made elastic perpendicular to its longitudinal extension. The connecting element can be made, for example, V-shaped for this purpose.

As in the initially described known overvoltage protection elements, the overvoltage protection element in accordance with the invention also preferably has a thermal disconnector for monitoring the state of the overvoltage limiting component. For this purpose, in the normal state of the overvoltage protection element, the second terminal lug is connected to the second connecting element via a solder site, the solder connection implemented at the solder site between the second terminal lug and the second connecting element separating when the temperature of the overvoltage limiting component exceeds a given boundary temperature. So that when the boundary temperature is reached the solder site separates, i.e., the end of the connecting element facing the terminal lug is moved away from the terminal lug, the connecting element itself can either be made elastic or exposed to the force of a separate spring.

The overvoltage protection element in accordance with the invention is preferably made as a "protective plug" so that together with the corresponding bottom part of the device it forms an overvoltage protection device. Here, in the housing of the overvoltage protection element there can also be several overvoltage limiting components connected in parallel, especially several varistors connected in parallel. If the overvoltage protection element has a double varistor, especially the middle, inner terminal lug of the double varistor can be connected integrally to the first connecting element of the overvoltage protection element.

In particular, there are now a host of possibilities for embodying and developing the overvoltage protection element in accordance with the invention. Reference is made in this respect the following description of preferred exemplary embodiments in conjunction with the accompanying drawings.

DETAILED DESCRIPTION OF THE INVENTION

Figure 1:
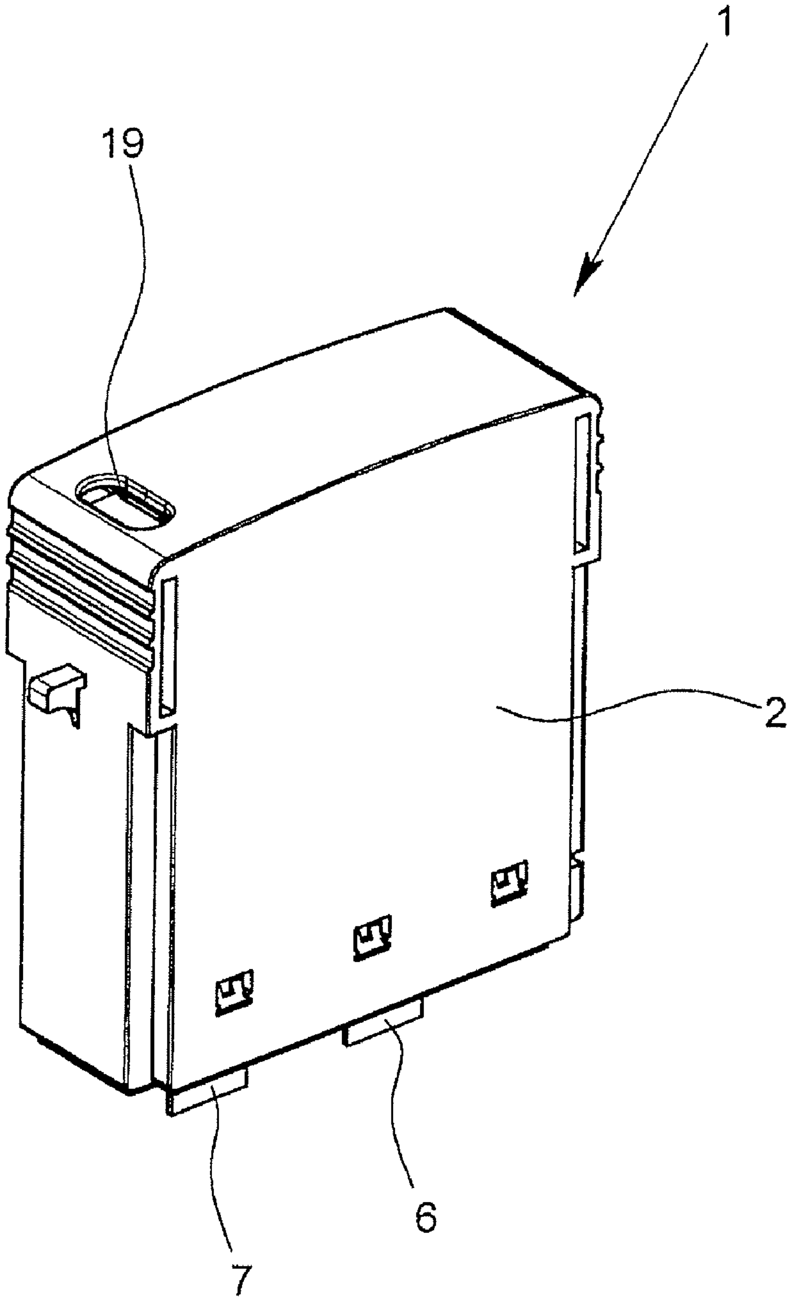
FIG. 1 is a perspective of one exemplary embodiment of an overvoltage protection element.

In FIG. 1, an overvoltage protection element 1 has a housing 2, there being an overvoltage limiting component in the housing 2. In the illustrated exemplary embodiments, the overvoltage limiting component is a varistor 3; alternatively, the overvoltage limiting component can also be formed by several varistors connected in parallel, especially a double varistor. Likewise, the overvoltage limiting component can also be a gas-filled surge arrester.

The two poles of the varistor 3 are each connected to a terminal lug 4, 5 in an electrically conductive manner, especially soldered or welded. The protective element 1 made as a protective plug moreover has two connecting elements 6, 7 which are made as plug-in contacts and which project out of the housing 2 through corresponding openings on the bottom of the overvoltage protection element 1. The plug-shaped connecting elements 6, 7 can be inserted into the corresponding sockets 8 of the bottom part of the device which is not shown, FIGS. 2 to 8 each schematically showing only one socket 8.

In contrast to the overvoltage protection elements which are known in the prior art and in which the terminal lugs 4, 5 and the connecting elements 6, 7 are made as separate components, in the protective element 1 in accordance with the invention, the first terminal lug 4 is integrally connected to the first connecting element 6, i.e., the end of the terminal lug 4 pointing away from the varistor 3 is made as a connecting element 6.

Figure 2:
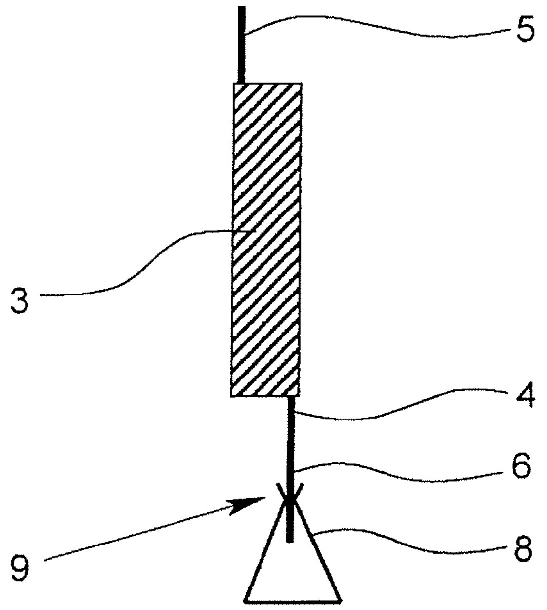
FIG. 2 is a simplified representation of a varistor with a first configuration of the terminal lug inserted into the socket of the bottom part of a device.
Figure 3:
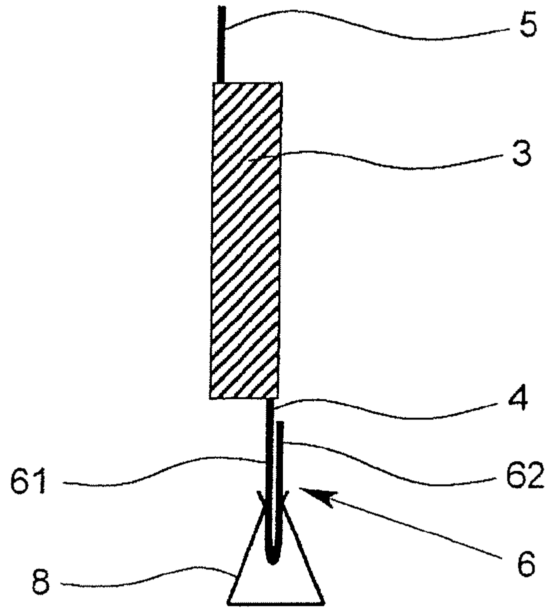
FIG. 3 is a simplified representation of a varistor with a second configuration of the terminal lug inserted into the socket.
Figure 4:
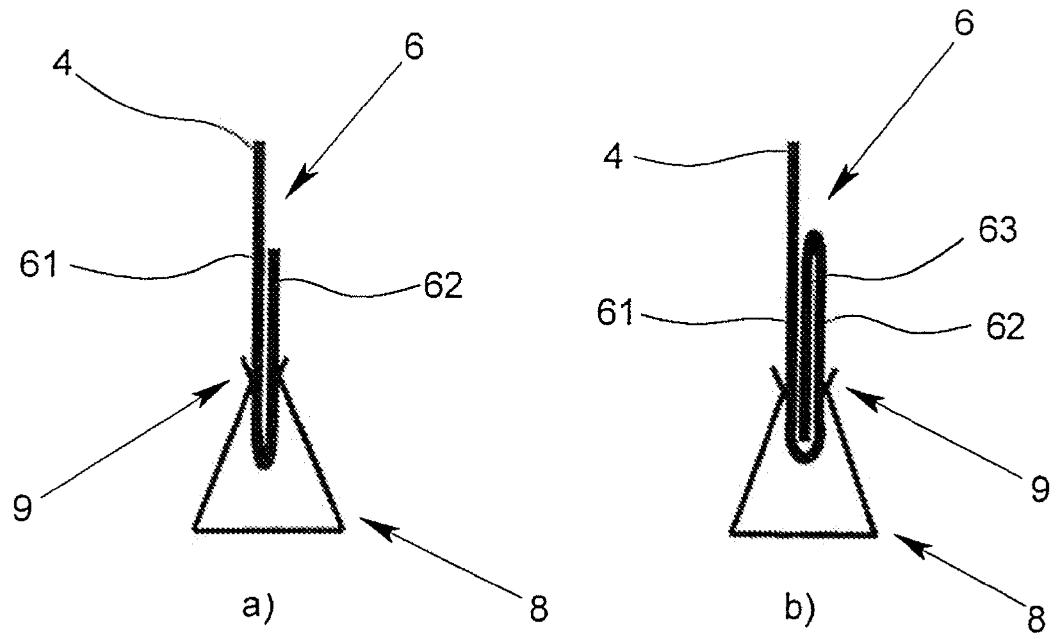
FIG. 4 shows two separate representations of the terminal lugs as shown in FIGS. 2 & 3 inserted into a socket.

While in the exemplary embodiment as shown in FIG. 2 the thickness of the connecting element 6 corresponds to the thickness of the terminal lug 4, in the exemplary embodiment shown in FIG. 3, the connecting element 6 is folded such that in the contact region 9 it has two layers 61, 62 which run essentially parallel to one another; the connecting element 6 is thus made in two layers so that the material thickness of the connecting element 6 is likewise doubled in the contact region 9. This folding of the connecting element 6 can easily increase its strength and stability so that the connecting element 6—in spite of the relatively low material thickness of the terminal lug 4—is not damaged even when repeatedly plugged into the socket 8 of the bottom part of a device. Instead of the single folding shown in FIGS. 3 & 4*a*. The connecting element 6 as shown in FIG. 4*b* can also be folded twice so that the connecting element 6 in the contact region 9 has three layers 61, 62, 63.

Figure 5:
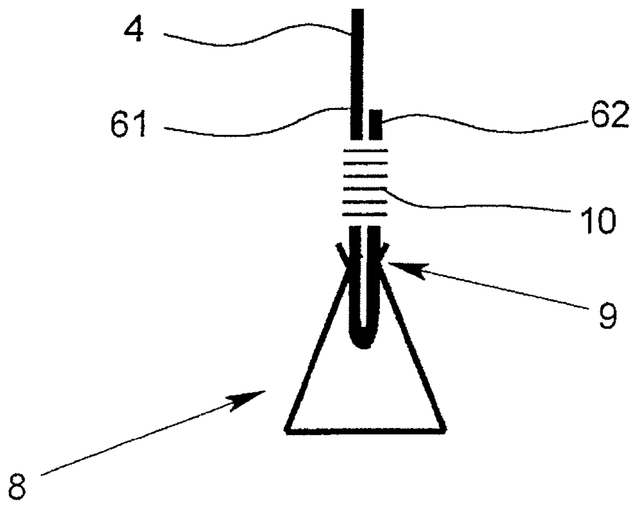
FIG. 5 shows the FIG. 4 version of a connecting element inserted into a socket.
Figure 6:
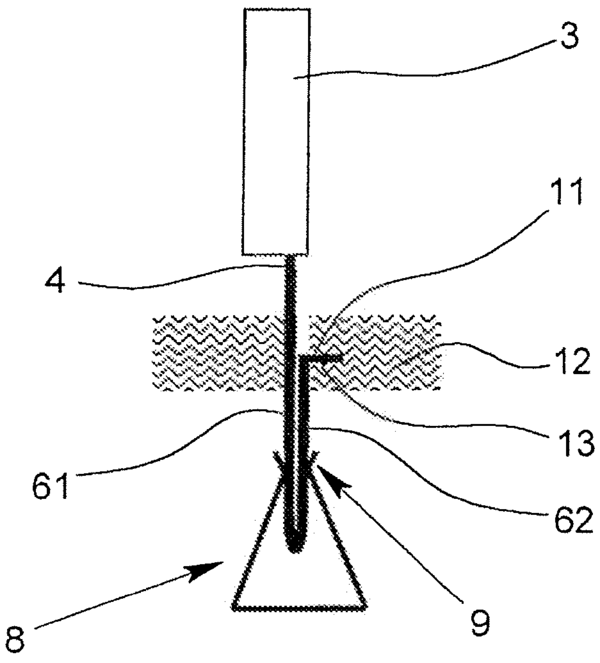
FIG. 6 is a simplified representation of a varistor with a terminal lug, similarly to FIG. 3, FIGS. 7*a* & 7*b* each schematically show the attachment of the first connecting element of the varistor in the housing.

As is apparent from FIG. 5, the mechanical strength of the connecting element 6 can be further increased by the individual layers 61, 62 being mechanically connected to one another, the connecting region 10 being located outside—specifically above—the contact region 9 so that the contact properties between the connecting element 6 and the socket 8 are not adversely affected.

It was stated initially that the varistor 3 is located within a housing 2, on the bottom of the housing 2 openings being formed through which the connecting elements 6, 7 protrude from the housing 2. As a result of the frictional force between the connecting elements 6, 7 and the sockets 8 in the bottom part of the device, when the overvoltage protection element 1 is plugged onto the bottom part of the device and when it is withdrawn from the bottom part of the device, a force acts on the varistor 3 which is connected to the connecting element 6 by way of the terminal lug 4. To reduce this force which acts on the varistor 3, between the first connecting element 6 and the housing 2 a positive connection is formed. As shown FIG. 6, the free end of the connecting element 6 has a bend 11 which engages a receiver 13 formed in the wall 12 of the housing 2 so that the bend 11 is held in the housing wall 12.

Figure 7A:
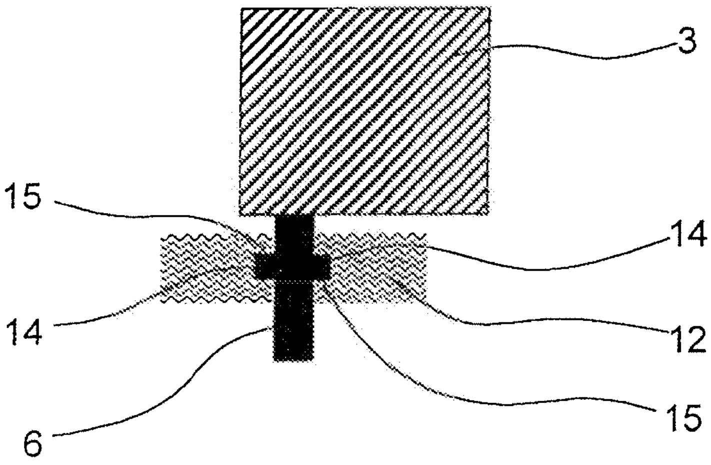
Figure 7B:
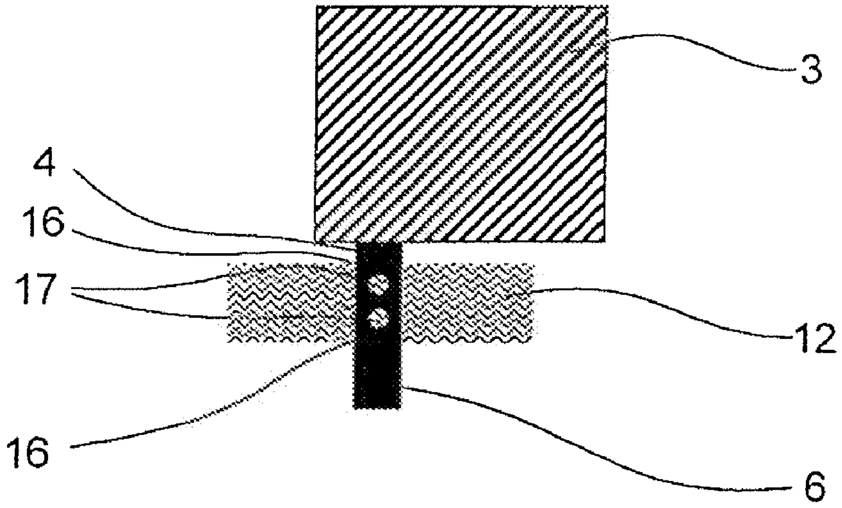

In the exemplary embodiment as shown in FIG. 7*a*, on the first connecting element 6 two laterally projecting catches 14 are formed and are held in two corresponding receivers 15 in the housing wall 12. In the exemplary embodiment shown in FIG. 7*b*, the positive connection between the first connecting element 6 and the housing 2 is implemented in that two holes 16 are formed in the connecting element 6 and the housing wall 12 corresponding to the holes 16 has two projections 17 which engage the holes 16. If the overvoltage protection element 1 is separated from the bottom part of the device, for which a user grasps the overvoltage protection element 1 on the housing 2 and pulls it off the bottom part of the device, the withdrawal forces are transmitted directly from the housing 2 to the connecting element 6 so that no force at all or only a much reduced force is acting on the varistor 3 which is located in the housing 2.

Figure 8:
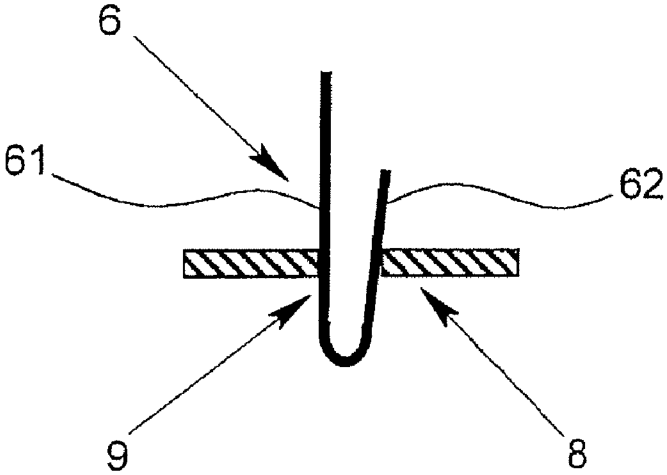
FIG. 8 is a simplified representation of alternative manner the connecting element to make contact with the plug receptacle of the bottom part of a device.

In the exemplary embodiments of the overvoltage protection element 1 which are shown in FIGS. 1 to 6, the contact force which is necessary to ensure good electrical contact between the connecting elements 6, 7 and the sockets 8 is ensured by the spring properties of the sockets 8, i.e., the sockets 8 are made elastic, while the connecting elements 6, 7 are made essentially rigid. FIG. 8 shows an exemplary embodiment in which, in contrast thereto, the socket 8 is made rigid and the connecting element 6 is made elastic so that the contact force between the connecting element 6 and the socket 8 is implemented by the spring properties of the connecting element 6. For this purpose, the two layers 61, 62 of the connecting element 6 are bent to one another such that the connecting element 6 is made roughly V-shaped, by which the connecting element 6 is made elastic perpendicular to its longitudinal extension.

Figure 9:
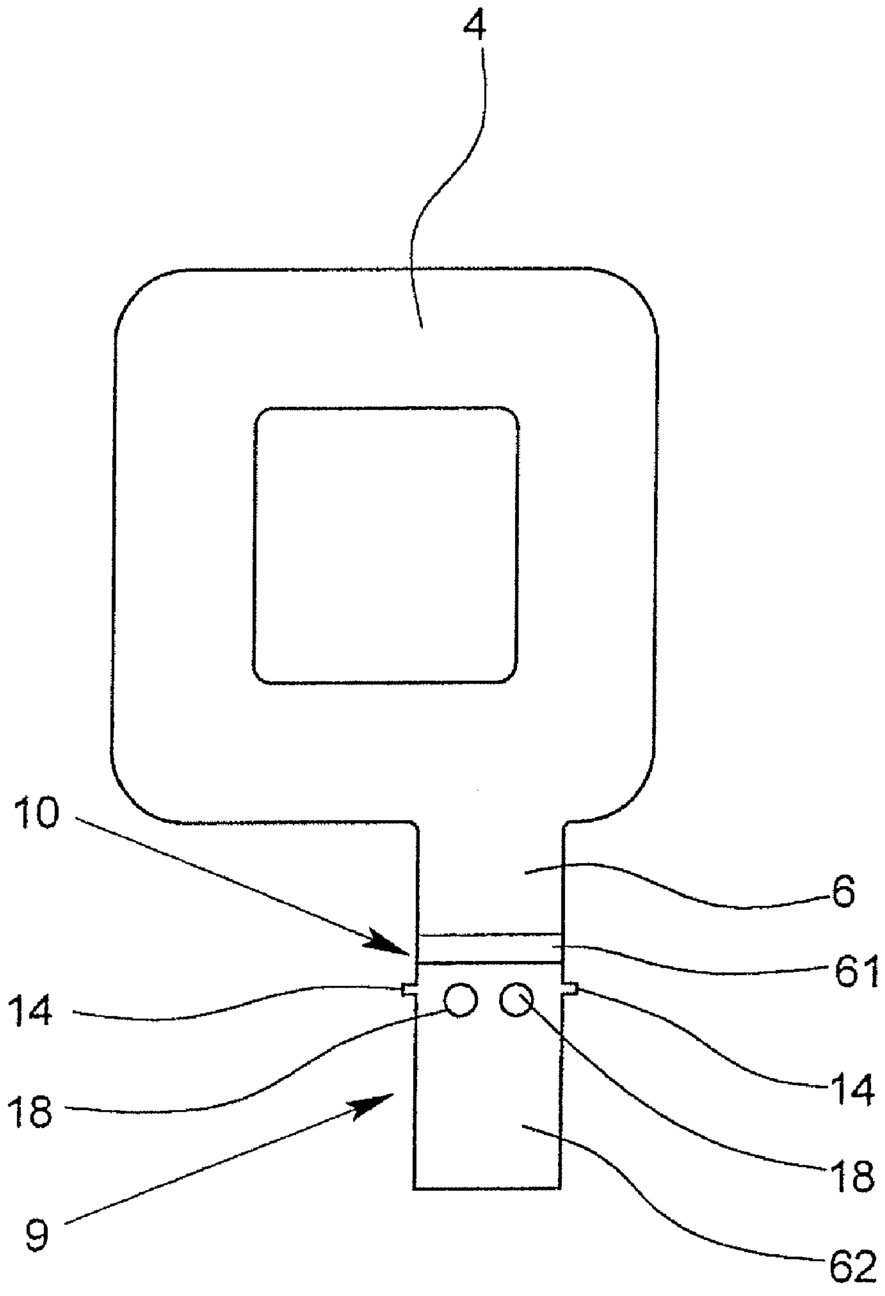
FIG. 9 shows one embodiment of a terminal lug in accordance with the invention with a connecting element.

FIG. 9 shows one preferred embodiment of a terminal lug 4 with a connecting element 6 which is connected integrally to it, the connecting element 6, as shown in FIG. 3, being folded such that it has layers 61, 62 which run essentially parallel to one another. As in FIG. 7*a*, two laterally projecting catches 14 are formed on the connecting element 6, specifically on the layer 62, and are used for fixing the connecting element 6 in the housing. To increase the stability of the connecting element 6, the two layers 61, 62 are securely connected to one another by rivets at the two points 18.

FIG. 1 shows that a viewing window 19 in the top of the housing 2 through which an optical state display can be read. The optical state display is connected to the second connecting element 7 such that the state display changes its state when a solder connection implemented between the second connecting element 7 and the second terminal lug 5 is opened. While in the normal state of the overvoltage protection element 1 or of the varistor 3, for example, a green segment of the optical state display can be detected through the viewing window 19, in the case of a fault of the overvoltage protection element 1 there is a red segment of the state display underneath the viewing window.

What is claimed is:

1. Overvoltage protection element, comprising:

a housing, at least one overvoltage limiting component which is located in the housing, two terminal lugs each of which is connected to a respective pole of the overvoltage limiting component in an electrically conductive manner, and two connecting elements for electrical connection of the at least one overvoltage protection element to a current or signal path to be protected, wherein, in a normal state of the overvoltage protection element, the connecting elements are in electrically conductive contact with the respective terminal lug, and wherein a first of the terminal lugs and a first of the connecting elements are integrally connected to one another, a free end of the first connecting element facing away from the overvoltage limiting component, the overvoltage limiting component being made as a plug-in contact, wherein the first connecting element is folded such that it has several layers in a contact region.

2. Overvoltage protection element in accordance with claim 1, wherein the at least one overvoltage limiting component is a varistor.

3. Overvoltage protection element in accordance with claim 2, wherein at least two layers of the first connecting element are bent toward one another such that the first connecting element is elastic perpendicular to its longitudinal extension.

4. Overvoltage protection element in accordance with claim 1, wherein individual layers of the first connecting element are connected to one another in a connecting region that is located outside of the contact region.

5. Overvoltage protection element in accordance with claim 1, wherein the first connecting element is connected to the housing by a positive connection.

6. Overvoltage protection element in accordance with claim 5, wherein a laterally extending bend or catch is provided on the first connecting element and wherein a receiver which corresponds to the bend or catch is provided in the wall of the housing.

7. Overvoltage protection element in accordance with claim 5, wherein at least one hole is provided in the first connecting element and at least one projection which corresponds to the hole is provided in the wall of the housing.

8. Overvoltage protection element in accordance with claim 1, wherein in the normal state of the overvoltage protection element, the second terminal lug of the overvoltage limiting component is connected to the second connecting element via a solder connection at a solder site, the solder connection separating when the temperature of the overvoltage limiting component exceeds a given boundary temperature.

9. Overvoltage protection element in accordance with claim 1, wherein the two terminal lugs are soldered or welded to a respective pole of the overvoltage-limiting component.

* * * * *